United States Patent [19]

Rosenthal

[11] 3,764,572
[45] *Oct. 9, 1973

[54] PROCESS OF GRANULATING POLYMERIC MATERIALS
[75] Inventor: Christian Rosenthal, Munich, Germany
[73] Assignee: Chemische Werke Munchen Otto Barlocher GmbH, Munchen, Germany
[ * ] Notice: The portion of the term of this patent subsequent to May 4, 1988, has been disclaimed.
[22] Filed: June 10, 1970
[21] Appl. No.: 57,008

Related U.S. Application Data
[63] Continuation-in-part of Ser. No. 649,088, June 26, 1967, abandoned, which is a continuation-in-part of Ser. Nos. 609,712, Jan. 10, 1967, abandoned, and Ser. No. 631,885, April 19, 1967, abandoned, said Ser. No. 631,885, is a continuation-in-part of Ser. No. 609,712.

[52] U.S. Cl............................ 260/23 XA, 264/117
[51] Int. Cl. ............................................. C08f 19/14
[58] Field of Search................. 264/117; 260/23 XA

[56] References Cited
UNITED STATES PATENTS
3,278,661  10/1966  Beck.............................. 264/117 X
3,577,489  5/1971  Rosenthal........................... 264/117

FOREIGN PATENTS OR APPLICATIONS
798,444    7/1958  Great Britain..................... 260/45.7
926,895    5/1963  Great Britain.................... 260/45.75
666,161    7/1963  Canada............................ 260/45.75
1,017,432  1/1966  Great Britain.................... 260/45.85

Primary Examiner—Donald E. Czaja
Assistant Examiner—M. J. Welsh
Attorney—Michael S. Striker

[57] ABSTRACT

Granulates of halogen-containing polymers are formed by dissolving a minor portion of the polymer at an elevated temperature in a softener or solvent or mixture of both and suspending the major portion of the polymer in water whereupon the solution of the polymer is stirred into the aqueous suspension and slowly heated upon continued stirring. At least part of the modifiers required in the final products are stirred into the aqueous polymer suspension in the form of a solution or dispersion of the modifiers in a softener or solvent or a mixture of softener and solvents.

8 Claims, No Drawings

PROCESS OF GRANULATING POLYMERIC MATERIALS

CROSS-REFERENCE TO RELATED APPLICATIONS

This application is a continuation-in-part of application Ser. No. 649,088, filed on June 26, 1967 by the same inventor in respect of "Method of Agglomerating Pulverulent Materials," now abandoned. The latter application, in turn, was a continuation in part of applications Ser. No. 609,712, filed Jan. 10, 1967 and entitled "Method of Agglomerating Pulverulent Materials," and Ser. No. 631,885, filed Apr. 19, 1967 in respect of "Method of Producing Granulated Halogen-Containing Polymers," both of these last-mentioned two applications having been filed by the same inventor and now being abandoned and application Ser. No. 631,885 having been filed as a continuation-in-part of application Ser. No. 609,712.

BACKGROUND OF THE INVENTION

In the above-listed parent application, Ser. No. 649,088, it has been proposed to form granulates of halogen-containing polymers by dissolving a minor proportion of the polymer at an elevated temperature in a softener or solvent or a mixture of softener and solvent while suspending the major portion of the polymer at a lower temperature in water and then stirring the solution of the polymer into the aqueous suspensions and heating the resulting mass slowly until granulation has occurred. The stirring is then discontinued, a further amount of water is added, and heating is continued for a short period of time to a temperature of from 80° up to above 100°C. If solvents are used, these are then removed by evaporation together with the water.

It has also been proposed to include in the granulation certain additives desired in the final product, such as stabilizers or lubricating agents. According to this aspect of the earlier case, the additives were suspended in water together with the major proportion of the polymer at room temperature, whereupon granulation was carried out as described. In this manner the final user is furnished a ready-made free-flowing granulate which has the desired optimum composition, depending upon the individual processing conditions, and in particular includes all modifiers desired in the final product, such as softeners, stabilizers, lubricants, fillers, antioxidants, antistatic agents, flame-retardants, dyes, pigments, etc. The problem with this earlier proposal was that some of the modifiers because of their hydrophobic properties are difficult to suspend in the aqueous phase. As a result, the final granulate is not entirely homogeneous. The processing industry, however, has a material interest in a granulate which is uniform in every respect.

It is therefore an object of the present invention to form a free-flowing granulate which in addition to the halogen-containing polymer contains all necessary modifiers such as are required during further processing and contains these modifiers in a completely homogeneous distribution in the granulate.

SUMMARY OF THE INVENTION

The invention resides in the feature that in the above-described process where a solution of a minor proportion of the polymer is stirred into an aqueous suspension of the major portion of the polymer, followed by slow heating and stirring, at least part of the modifiers required for further processing and in connection with the properties of the final products is stirred into the aqueous polymer suspension in the form of a solution or dispersion of such modifiers in a softener or solvent or mixture of softener and solvent. The solution or dispersion of the modifiers may be effected in the minor portion of the polymer which is dissolved in the softener or solvent or mixture thereof, or the solution or dispersion of the modifiers in the softener or solvent may be set up separately. In either case, the mass is then added to the aqueous suspension of the polymer.

DESCRIPTION OF THE PREFERRED EMBODIMENTS

The term "modifier" used in this application should be understood to include, in the first place, the stabilizers usually added to this type of polymers. By way of illustration of further additives included in the term modifier, the following materials may be mentioned:

lubricants, such as stearic acid, cetyl palmitate, calcium stearate, spermaceti;

fillers, such as kaolin, chalk, heavy spar (barite);

flame-retardants, such as antimony trioxide, zinc borate, and chloroparaffin;

antistatic agents, such as compounds of the formula $(C_6H_5-CH_2-N(CH_3)_2-CH_2-CH_2-CH_2-NH-CO-C_{17}H_{35})^+$ $Cl^-$, oleic acid-diethanolamide, linoleic acid-monoethanolamide;

dyes, such as phthalocyanine blue ("Heliogenblue L-BGN"), dye lacquers of monoazosulfonic acid ("Litholred RS");

pigments, such as titanium dioxide, carbon black, iron oxide; and antioxidants, such as p,p'-isopropylidenediphenol ("Bisphenol A") and 2,6-di-tert-butyl-p-cresol.

Regarding the types of polymers, the process of the invention is applicable to all halogen-containing polymers, preferably polymerisates of vinyl halides and specifically vinylchloride polymerisates. This includes vinylchloride homopolymerisates and copolymerisates, which latter in addition to a major portion of vinyl chloride units include a minor portion of units derived, for instance, from vinyl acetate or vinylidene chloride.

The polymerisates can be made by any conventional process, such as emulsion, suspension, bulk or graft-polymerization and can have any of the conventional molecular weight ranges (K-values).

In a preferred embodiment, granulation is carried out by using the suspension or emulsion as it is present at the end of the polymerization operation proper.

In the following detailed description, the invention is illustrated by using polyvinyl chloride (PVC) as the polymer. It will be understood, however, that the invention is not limited to this particular polymer.

In using PVC together with a softener, it is preferred to carry out the granulation with an amount of softener which is between 10 and 100 parts by weight relative to 100 parts by weight of resin. Most preferred is the range between 30 and 80 parts by weight of softener. In general, the amount of softener should be such as is desired in the final granulate.

If the customary amounts of softener are used, that is, between 80 and 30 parts by weight relative to 100 weight-parts of PVC, granulation according to the present process can be effected by using only the softener without any further addition of solvents. However, if lower amounts of softener are used, an increasing amount of solvent must be used in the granulation.

As softeners, all types of softeners are useful which are customarily employed in this connection. Thus, for instance, the softener may be a phthalic acid ester but in addition may also be a sebacic acid ester, phosphoric acid ester, and also polymer softeners such as polypropylene-glycol adipate ("IW 615" of the Chemische Werke Witten), polyesters made of adipic acid and butanediol ("Palamoll 646" of the Badische Anilin- und Sodafabrik), high-molecular xyleneformaldehyde resin ("Plastikator FH" of the Farben-fabrik Bayer), and a low-molecular mixed polymerisate of butadiene and acrylonitrile ("P 3805" of the Farbenfabrik Bayer), and epoxy softeners such as octylepoxy stearate or epoxidized soybean oil may be employed.

When granulating hard PVC, one may use from 10 to in excess of 400 weight-parts of solvent for each 100 weight-parts of polyvinylchloride. The preferred amount is between 100 and 200 weight-parts.

Suitable solvents, if such are used, are organic solvents having boiling points between 30° and 200°C, preferably between 60° and 100°C. Useful are also solvents which can be volatilized with water vapor. Examples of solvents are aromatic hydrocarbons such as benzene, toluene or xylene, aliphatic hydrocarbons, esters such as butylacetate; ketones such as cyclohexanone; ethers such as dibutylether; and also solvent mixtures such as a mixture of toluene and acetone. Chlorinated hydrocarbons such as carbon tetrachloride are useful when effecting the granulation from an emulsion polyvinylchloride.

The granulate particles should be smaller in proportion as the amount of solvent is lower and on the other hand should be larger in proportion as the amount of solvent is increased. The same applies to the softener which is used for the granulation of soft PVC. If the granulation is carried out only with a softener, that is, without a solvent, the particles of the granulate will be smaller in proportion to decreased amounts of softener, that is, in proportion to increased hardness of the PVC soft granulate.

The addition of solvents to the softener during the granulation in the process of the invention serves also as a means of controlling the size of the granulate. If in addition to the softener increasing amounts of solvent are used, the size of the granulate will increase up to pea-size. The size of the granulate, furthermore, depends on the ratio of softener or solvent or mixture of both to water. The grains of the granulate will be smaller in proportion to increasing amounts of water used in the dispersion of the resin.

The process of the invention may be carried out by dissolving a small part of the polymerisate, preferably between 1 and 10% by weight, and most preferably between 2 and 5% by weight at a temperature between 35° and 200°C, preferably between 100° and 150°C, in the total amount of softener or softener-solvent mixture. In this form, a "presolution" is formed. The remaining and principal part of the resin is separately suspended in water at room temperature, preferably in from one to two times the amount of water while heating the mass. The solution is then combined with the suspension. The mixture is then further heated while stirring until granulation takes place, which usually is the case between 40° and 60°C. Subsequently, the stirring is terminated while heating is continued to a temperature between 80° and 100°C.

If no solvent is used, the final granulate can be obtained after a brief heating, such as for a period of between 5 and 15 minutes, by conventional means such as decanting, filtering, centrifuging, or screening. If the granulation is carried out in the presence of a solvent, the latter is preferably evaporated together with the water and can be recovered for further use. The heating period in that case must be more extended.

In all these cases, the modifiers, particularly the stabilizers, are incorporated in the above-mentioned "presolution" of the minor portion of the halogen-containing polymers in the softener or solvent or mixture of both if the modifiers can easily be dispersed in the softener or solvent at increased temperature without being subject to melting or to formation of lumps. Stabilizers which may be used in this manner are particularly those of an inorganic nature.

If such insoluble modifiers, or modifiers which have only a low solubility, during heat-treatment are compatible with the softeners or solvents so that they are at least wetted by the softener or solvent and do not form lumps at increased temperature, they can be incorporated in the mass together with the presolution, as stated. The materials which in this manner can be used in the presolution are, for instance, stabilizers composed of basic lead salts, such as basic lead sulfates, -phosphites, -carbonates, -sulfites, -maleates and -salicylates.

However, a different handling is necessary if the modifiers dissolve at increased temperatures at least partially in the softener or solvent or result in a substantial softening of the softener or solvent or in lump formation. In that case, it is preferred to separate a small part, for instance between 1 and 20% by weight of the softener or solvent (relative to the total amount thereof) prior to adding the halogen-containing polymer. The modifiers are then dispersed or dissolved in this small part of solvent or softener at room temperature or at a temperature which is only slightly higher. This solution, or partial dispersion, is then added to the suspension of the halogen-containing polymer separate from the presolution above referred to.

This is the preferred procedure in using stabilizers such as calcium, barium, cadmium, zinc, or lead soaps of carboxylic acids having from 6 to 30 carbon atoms or mixtures of such soaps. This, likewise, is the process preferred when using liquid stabilizers of the metals just listed as well as organo-tin mercaptides or organo-tin carboxylates. The same applies when esters are used of phosphoric acid or when epoxidized compounds are used.

The process of the invention is particularly useful for the granulation of emulsion polyvinylchloride because the emulsifying agent which frequently is undesirable for the latter processing is washed out to a large extent during the granulation.

The following Examples will illustrate the invention.

EXAMPLE 1

The starting material for the granulation in this case was a suspension obtained from the polymerization of 96.2 parts by weight of suspension PVC, K-value 70 (trade name "Vinnol H 70 f" of the Wacker-Chemie Company) in 340 weight-parts of water.

A mass was separately formed by stirring with a blade stirrer, without heating, at 1200 rpm, a mixture of the following:

3.8 wt-parts S-PVC, Wacker Vinnol H 70 f
40.0 wt-parts chalk
3.0 wt-parts tribasic lead sulfate (V 220 MC of the Bärlocher Company)
1.0 wt-parts tribasic lead stearate and
0.5 wt-parts titanium dioxide in
46 wt-parts diisononylphthalate and
14 wt-parts chloroparaffin (52% chlor).

This mixture was heated while stirring to between 135° and 140°C and was stirred into the suspension which had been heated to 70°C. Subsequently, the mixture was heated to 95°C upon continued stirring. During this step, granulate grains formed immediately with a diameter between 2 and 4 mm. The thus formed granulate was screened off and dried.

EXAMPLE 2

The same process was employed as in Example 1, escept that to form the suspension, 400 weight-parts of water were used and the latter was heated to 82°C prior to stirring the mixture and the softener into the suspension. Subsequent steps were as in Example 1.

There were obtained granulate grains of a diameter between 2 and 3 mm.

EXAMPLE 3

The same process was used as in Example 1, except that the suspension was formed by employing 200 weight-parts of water and heating the latter to 92°C prior to stirring in of the softener mixture. The other steps were as in Example 1.

There were obtained granulate grains of a diameter between 3 and 6 mm.

EXAMPLE 4

14.3 weight-parts of emulsion polyvinylchloride (Type "Vestolit 7003" of the Chemische Werke Hüls) were suspended in 60 weight-parts of water. 0.7 weight-part of polyvinyl chloride was dissolved at 140°C in 8.1 weight-parts of dioctylphthalate.

In addition, 0.225 weight-part of barium-cadmium-laurate and 0.075 weight-part of trinonyl-phenylphosphite were stirred into 0.3 weight-part of dioctylphthalate. The barium-cadmium-laurate contained 1% by weight of diphenyl-ol-propane and 18% by weight of pentaerythrite relative to the amount of barium-cadmium-laurate. This presolution was stirred into the first-described aqueous suspension at 85°C and the stabilizers were added in the softener and were further processed as in Example 1 to form the granulate.

There was thus obtained a free-flowing granulate which met all requirements of the industry. The granulate grains in particular showed excellent homogeneity of the materials contained therein.

EXAMPLE 5

300 weight-parts of a 40% aqueous emulsion of polyvinyl chloride ("Solvic 136") were diluted with 450 weight-parts of water at room temperature. A solution of 10 weight-parts of emulsion polyvinylchloride ("Solvic 136") was separately formed at 70°C in 1,400 weight-parts of a mixture of 1,200 weight-parts of toluene and 300 weight-parts of ethyl acetate. 2 weight-parts of tribasic lead sulfate were suspended in this solution to form what has been called the "presolution."

In addition, 0.5 weight-part of calcium stearate, 0.2 weight-part of stearic acid and 0.4 weight-part of spermaceti were dissolved in 100 weight-parts of a mixture formed by 1,200 weight-parts of toluene and 300 weight-parts of ethyl acetate. The solution was effected at room temperature. The final solution was then combined with the above-described emulsion while stirring. Subsequently, the presolution, which had been heated to 70°C, was stirred into this emulsion.

After about 5 minutes, granulate grains of a diameter between 2 and 3 mm were formed. The solvent mixture was removed with superheated steam while continuing the stirring. The resulting granulate was recovered by screening and was then dried.

EXAMPLE 6

A suspension was formed from 90 weight-parts of suspension polyvinylchloride ("Vinnol H 70 f") and 300 weight-parts of water at a temperature of 50°C. Separately, 2 weight-parts of spermaceti, 0.2 weight-part of stearic acid and 1.5 weight-part of di-n-butyl-tin-dioleate were dissolved at room temperature in 10 weight-parts of di-2-ethylhexylphthalate and 50 weight-parts of toluene and stirred into the suspension, which was at a temperature of 50°C.

Separately, 30 weight-parts of chalk, 3 weight-parts of oleic acid-diethanolamide and 0.2 weight part of the dye "Litholred RS" were dispersed in 90 weight-parts of di-2-ethylhexylphthalate and 150 weight-parts of toluene at a temperature of 30°C. The dispersion was then heated to 100°C and there were added 10 weight-parts of suspension polyvinylchloride ("Vinnol H 70 f").

There thus was formed a solution of PVC in a softener-solvent mixture which may be designated as the presolution.

This presolution, which was at a temperature of 100°C, was then added upon stirring to the suspension in which had been incorporated the above-mentioned modifiers and which had been heated to 50°C. The granulate formed immediately after combining the two masses during stirring.

The solvent was subsequently driven off by steam, the granulate was recovered by screening and was then dried.

The grains of the granulate had a diameter between 3 and 4 mm.

Without further analysis, the foregoing will so fully reveal the gist of the present invention that others can, by applying current knowledge, readily adapt it for various applications without omitting features which fairly constitute essential characteristics of the generic and specific aspects of this invention, and therefore, such adaptations should and are intended to be comprehended within the meaning and range of equivalence of the claims.

What is claimed as new and desired to be protected by Letters Patent is set forth in the appended claims:

1. In a process wherein agglomerates of finely subdivided synthetic polymer particles are prepared by:
   a. preparing a heated aqueous homogenous suspension of said polymer particles by vigorously stirring a mixture of said polymer and water at a temperature of at least 80°C., said particles being of a type which is at most slightly soluble in water, and to which water is inert;

b. preparing at a temperature of at least 80°C a granulating solution for said suspension by dissolving within a liquid organic solvent a granulating agent consisting of a synthetic organic plastic polymer;
c. adding said granulating solution to said aqueous suspension with continuous and vigorous stirring at an elevated temperature below 100°C and sufficiently high to form agglomerates of said subdivided particles adhered to each other by said granulating agent; and
d. separating said formed agglomerates from the liquid mass, the improvement that at least part of the modifiers required for further processing or for the properties of the final product is stirred into said aqueous homogeneous suspension of said polymer in the form of a solution or dispersion of the modifiers in a softener or solvent or a mixture of softener and solvent.

2. The process of claim 1 wherein the modifiers are dissolved or dispersed in the solution of between 1 and 10% by weight, of the polymer in a softener, solvent or mixture of both whereupon the mass is stirred into the said suspension of the rest of the polymer.

3. The process of claim 1 wherein the modifiers are dissolved or dispersed in between 1 and 20 weight percent of the softener, solvent or mixture of both relative to the total amount of softener, solvent or mixture thereof and separately from the said solution of the polymer whereupon the mass is stirred into the suspension of the polymer.

4. The process of claim 1 wherein all of the said modifiers are added in the form of said solution or dispersion in a softener or solvent or mixture thereof.

5. The process of claim 2 wherein the modifiers comprise basic lead salts.

6. The process of claim 5 wherein the modifiers comprise basic lead sulphates, basic lead phosphite, basic lead carbonate, basic lead sulfite, basic lead maleate or basic lead salicylate.

7. The process of claim 3 wherein the modifier comprises calcium, barium, cadmium, zinc or lead soaps of carboxylic acids having 6 to 30 carbon atoms or a mixture of such soaps.

8. The process of claim 3 wherein the modifier comprises a liquid stabilizer of a calcium, barium, cadmium, zinc, or lead compound, an organo-tin mercaptide, an organo-tin carboxylate, an ester of phosphoric acid or an epoxy ester.

* * * * *

UNITED STATES PATENT OFFICE
CERTIFICATE OF CORRECTION

Patent No. 3,764,572            Dated October 9, 1973

Inventor(s) Christian Rosenthal

It is certified that error appears in the above-identified patent and that said Letters Patent are hereby corrected as shown below:

On the cover sheet insert -- [30] Foreign Application Priority Data:

Germany    April 28, 1966    C38 904 IVc/39b
                    June 28, 1966     C39 466 IVa/12g
                    July 1, 1966      C39 506 IVa/12g
                    September 16, 1966  C40 148 IVc/39b
                    March 9, 1967    C41 719 IVc/39b  --.

Signed and sealed this 19th day of March 1974.

(SEAL)
Attest:

EDWARD M. FLETCHER, JR.          C. MARSHALL DANN
Attesting Officer               Commissioner of Patents